United States Patent [19]

Southerland

[11] Patent Number: 5,535,666
[45] Date of Patent: Jul. 16, 1996

[54] COOKING APPARATUS

[76] Inventor: Glenn Southerland, P.O. Box 78, Drasco, Ark. 72530

[21] Appl. No.: 373,542

[22] Filed: Jan. 17, 1995

[51] Int. Cl.⁶ .............................. A47J 37/00; A23B 4/03
[52] U.S. Cl. .............................. 99/449; 99/482; 126/9 A; 126/30
[58] Field of Search .................. 99/482, 449; 126/25 R, 126/9 A, 30, 29

[56] References Cited

U.S. PATENT DOCUMENTS

| | | | |
|---|---|---|---|
| 2,561,746 | 7/1951 | Merrill | 144/136 |
| 3,000,372 | 9/1961 | Hall | 126/9 |
| 3,010,495 | 11/1961 | Ipsen | 144/136 |
| 3,394,693 | 7/1968 | Robinson | 126/25 |
| 3,491,743 | 1/1970 | Temp | 126/9 |
| 3,575,156 | 4/1971 | Hosford | 126/25 |
| 3,821,926 | 7/1974 | Clark | 99/340 |
| 4,531,506 | 7/1985 | Chambers et al. | 126/9 A |

*Primary Examiner*—David Scherbel
*Assistant Examiner*—Reginald L. Alexander
*Attorney, Agent, or Firm*—Kohn & Associates

[57] ABSTRACT

An assembly (10) adapted for use heating a food product includes a wooden log section (12) having a cavity (14) therein defining a trough (17) for containing a solid fuel (26) and a metal grill (28) having a frame (30) adapted to and supported by the wooden log section (12) for supporting a food product to be heated. An apparatus (50) for forming the cavity (14) in the wooden log section (12) is provided and includes a support base (52), a pivotal member (54) pivotally mounted to the support base (52), a handle (60) mounted on the pivotal member (54), a support (62) mounted on the pivotal member (54) for supporting a cutter (64), a rotary cutter (64) connected to the support (62), a spring (68) operatively connected to the support base (52) and the pivotal member (54) biases the pivotal member (54) away from the support base (52), and a clamp mechanism (70) mounted on the support base (52) for clamping the log section (12) in a fixed position.

8 Claims, 2 Drawing Sheets

5,535,666

COOKING APPARATUS

TECHNICAL FIELD

The present invention generally relates to an assembly and apparatus for making the same for use as a cooking device. More particularly, the present invention relates to a wooden log section adapted for heating food products.

BACKGROUND OF THE INVENTION

Charcoal grilling food products is a method of cooking which has gained in popularity in recent years. The popularity of charcoal grilling can be attributed to, in large part, the increase in outdoor activities such as camping and hiking. It is common in these activities to utilize a small, portable barbecue grills such as a "Hibachi" to cook various meats and other food items using charcoal as fuel.

In general, the small barbecue grills are made of cheap, lightweight metals and consist of a charcoal receptacle and a grill upon which the food items are placed during cooking.

Frequently, in order to enhance the flavor of the food being cooked on the grill, wood chips, such as hickory chips are placed on top of the burning coals and the smoke given off by these smoldering wood chips imparts flavor to the foods being cooked.

Since these conventional grill assemblies are typically made of metal, they are often cumbersome and heavy making them inconvenient for portable use in outdoor hiking and camping. Furthermore, after a conventional grill assembly has been utilized, the user must then transport the assembly from the outdoor site so that the grill may be properly disposed of. That is, these conventional grill assemblies cannot be easily disposed of following their use.

It would, therefore, be advantageous to provide a cooking apparatus which is biodegradable and, therefore, which can be easily disposed of. Additionally, it would be advantageous to provide a cooking apparatus which intrinsically imparts flavor to the food items being cooked adding additional wood chips to the charcoal.

The present invention provides an assembly for heating a food product, the assembly being easily biodegraded and, therefore, easily disposed of. Additionally, the present invention provides an intrinsic mechanism for imparting smoked flavor into a food item being cooked. Finally, the present invention provides an apparatus for forming the novel cooking assembly of the present invention.

SUMMARY OF THE INVENTION AND ADVANTAGES

In accordance with the present invention, there is provided an assembly adapted for heating a food product, the assembly including a wooden log section having a cavity for containing a solid fuel and a metal grill supported by the wooden log section having a surface for supporting a food product being heated.

The present invention further provides an apparatus for forming the cavity in the wooden log section to provide a trough. The apparatus includes a support base, a pivotal member mounted to the support base, a handle mounted on the pivotal member, a support mounted on the pivotal member, a rotary cutter mounted on the support, a spring operatively connected to the support base and the pivotal member and biasing the pivotal member away from the support base, and a clamp mounted on the support base for clamping a log section in a fixed position.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

Figure 1:
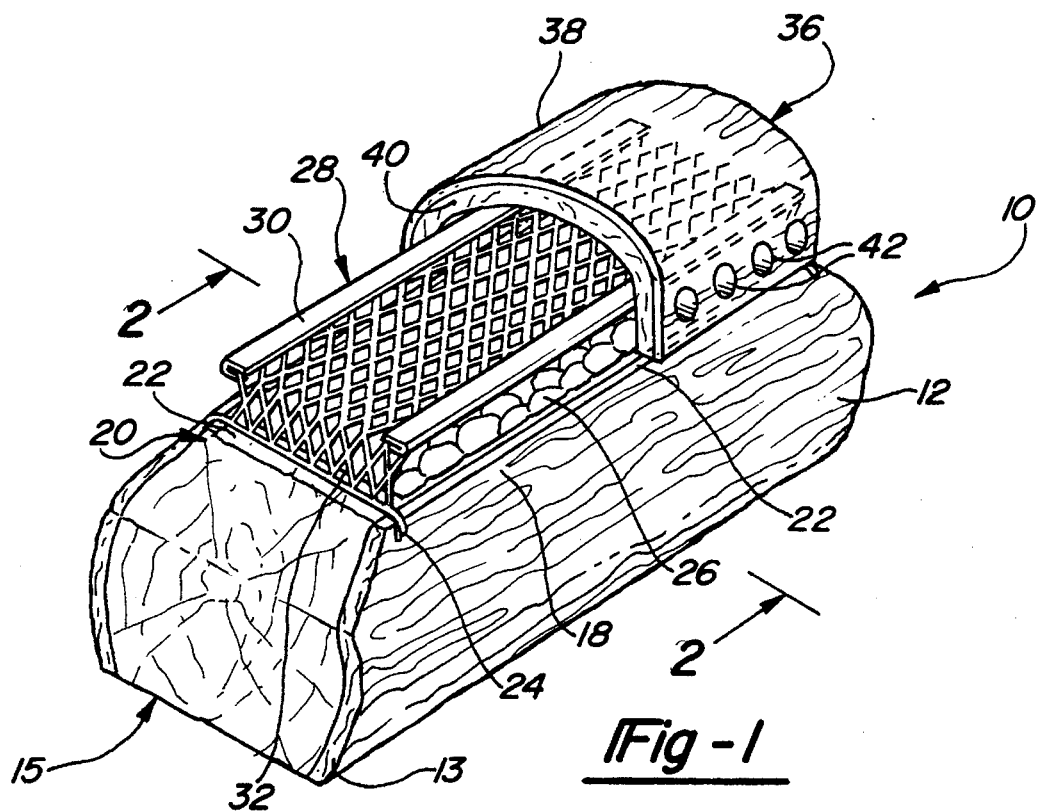
FIG. 1 is a perspective view of the cooking apparatus of the present invention.
Figures 2, 3:
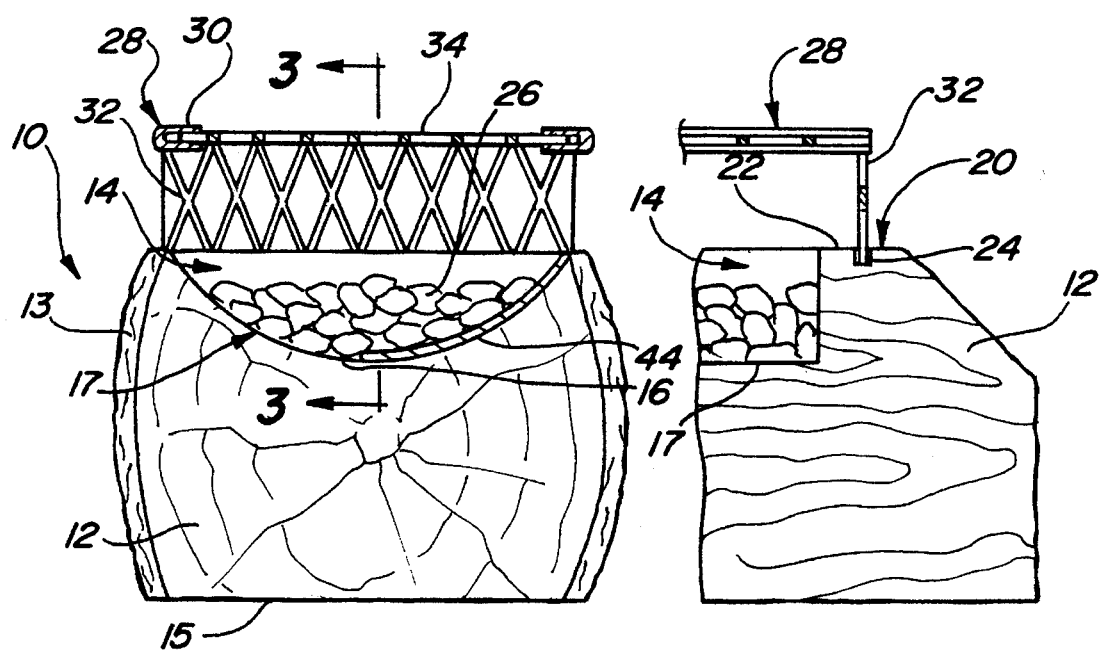
FIG. 2 is a cross-sectional view of the assembly of the present invention taken along line 2—2 of FIG. 1.
FIG. 3 is a cross-sectional view of the assembly of the present invention taken along line 3—3 of FIG. 2.

Referring to FIGS. 1, 2 and 3, a cooking apparatus according a preferred embodiment of the present invention is generally shown at 10. The assembly 10, a cooking apparatus, comprises a wooden log section 12 having a cavity 14 provided therein which defines a trough having a bottom 16, two side walls 18, and two end walls 20. Each end wall 20 terminates in a free upper edge 22. The free upper edges 22 of the end walls 20 are provided with a plurality of spaced-apart slots 24 which are juxtaposed with respect to the slot 24 of the upper edge 22 of the other end wall 20.

The cavity 14 is adapted to contain a solid fuel 26. The solid fuel 26 can be charcoal, woodchips or any other solid fuel normally used for "outdoor cooking".

The solid fuel 26 utilized in the present invention is charcoal, however, any other suitable fuel, such as wood chips, may be utilized. In the preferred embodiment, charcoal briquettes are the preferred solid fuel 26.

The assembly 10 also includes a base 15 adapted to support the assembly 10. The base 15 can consist of a flat section cut from the log section 12. Alternatively, other base supports can be fabricated.

A metal grill 28 is provided having a frame 30 including a plurality of transverse members 32 adapted to engage the slots 24 provided in free upper edges 22 of the end walls 20. The transverse members 32 of the metal grill 28 are adapted to engage the slots 24 provided in the free upper edges 22 of end walls 20 to securely retain the metal grill 28 therein. Additionally, the metal grill 28 has a surface 34 for supporting a food product (not shown).

Figure 4:
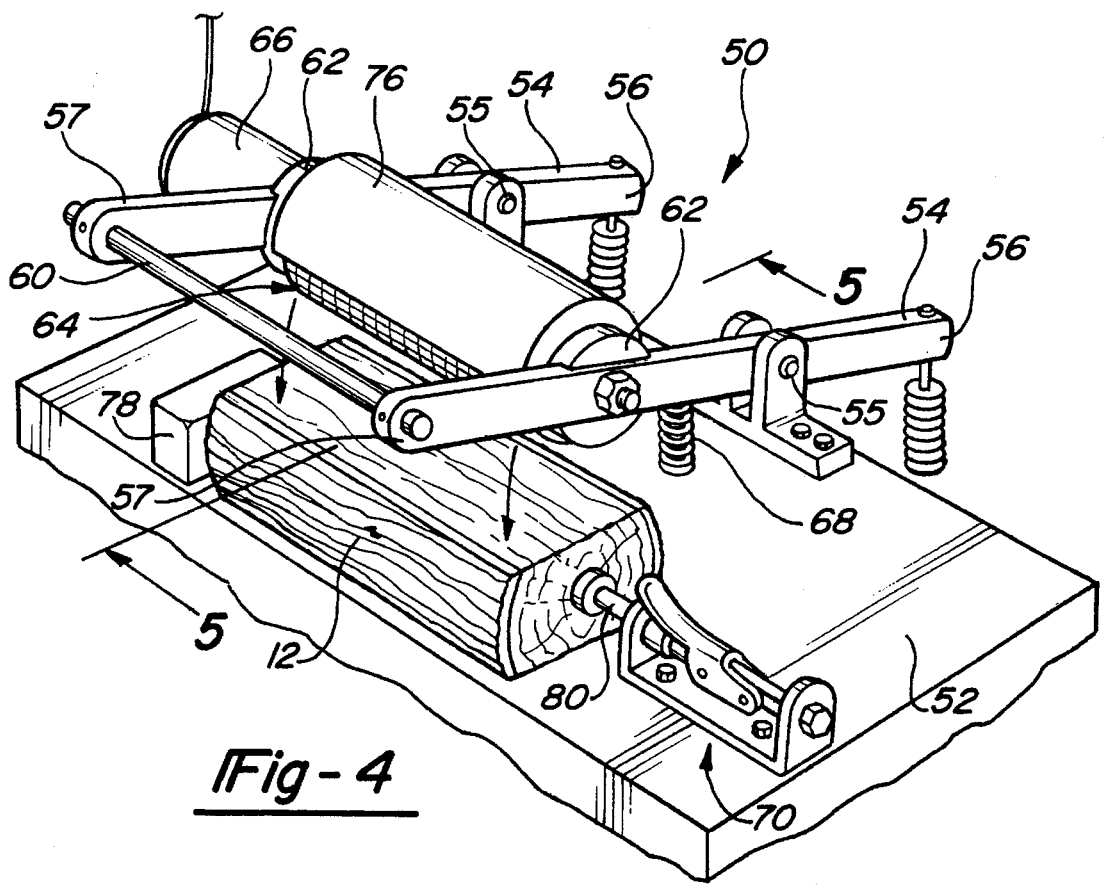
FIG. 4 is a perspective view of the apparatus for forming a cavity in a wooden log section according to the present invention.
Figure 5:
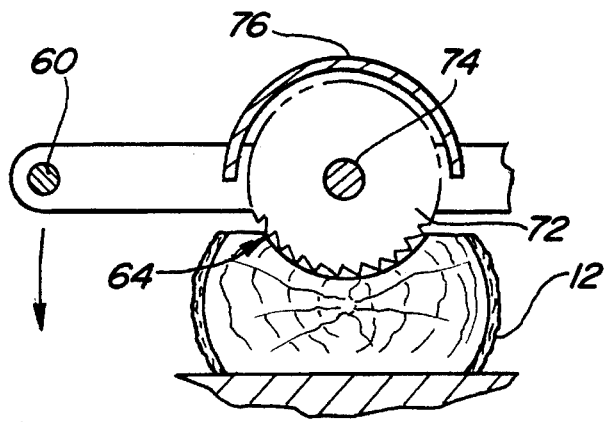
FIG. 5 is a cross-sectional view of the apparatus of the present invention taken along line 5—5 of FIG. 4.
Figure 6:
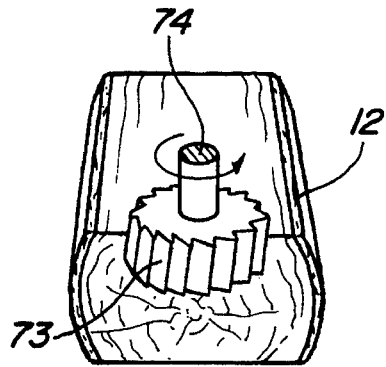
FIG. 6 illustrates an alternative embodiment of the apparatus of the present invention wherein a rotary cutting head is used for forming the cavity in the wooden log section.

An apparatus 50 for forming the cavity 14 in the wooden log section 12 is shown in FIGS. 4, 5, and 6. The apparatus 50 includes a support base 52 having at least one pivotal member 54 having a proximal end 56 and a free end 57 is pivotally mounted at the proximal member end 56 to the support base 52. A handle 60 is mounted on the pivotal member 54 at a position spaced apart from the proximal end 56 of the pivotal member 54. The apparatus 50 further includes a support 62 mounted on the pivotal member 54 at a position spaced apart from the proximal end 56 thereof.

The rotary cutter 64 mounted on the support 62 is adapted to be rotated by an electric motor 66. Spring 68, operatively connected to the support base 52 and the pivotal member 54 bias the free end 57 of the pivotal member 54 away from the support base 52.

A clamping device 70 mounted on the support base 52 is adapted to clamp the log section 12 in a fixed position during the cavity formation.

Referring specifically to FIG. 4, the rotary cutter 64 includes a plurality of circular saw blades 72 aligned side by side and mounted on a common spindle 74.

Referring specifically to FIG. 6, an alternative embodiment of the apparatus 50 is shown wherein the cutter includes a milling head 73.

The wooden log section 12 is constructed from a bisected cylindrical log section. That is, the log section 12 is roughly semi-circular in cross-section. Portions of bark 13 attached to the log section 12 are removed during the process of forming the assembly 10.

The wooden log section 12 included in the assembly 10 can be constructed of any suitable type of wood. Preferably, the wood is selected such that smoke created upon combustion of the wood imparts a pleasing flavor to the food being cooked on top of the grill. Preferred types of wood include, but are not limited to, hickory and oak.

The cavity 14 formed in the wooden log section 12 defines a trough 17 having a bottom 16, two-side walls 18 and two end walls 20. Each end wall 20 terminates at the upper edge 22. These free edges 22 define the upper most boundaries of the cavity 14.

The metal grill 28 can be constructed of any suitable material which is capable of withstanding the heat generated by the combustion of the solid fuel 26. In the preferred embodiment, the grill 28 is constructed of a metal material such as steel and forms a lattice or grill work which allows for the transmission of heat from the combusting solid fuel 26 to reach the food product being heated. Additionally, the grill 28 allows for the passage of liquid grease or other by-products produced during cooking of the food product to pass into the combusting solid fuel 26. Additionally, the metal grill 28 includes a frame 30 which provides a plurality of transverse members 32 which engage the slots 24 provided in the free upper edges 22 of the end walls 20 to securely retain the grill 28 therein. That is, the transverse members 32 engage the slots 24 and are securely retained by friction. The metal grill 28 additionally provides a surface 34 for supporting the food to be heated.

The grill 28 also includes structure for positioning the surface 38 for supporting the food product at a position spaced a distance above the free edges 22 of the side walls 18 and the end walls 20. That is, tabs 32 can be integrally formed in the grill 28 to engage the slots in the free upper edges 22 of the side walls 18 and are adapted to position the food supporting surface 34 a predetermined height above the free edges 22 and the solid fuel 26.

Additionally, an optional cover or top 36 can be utilized with the assembly 10 of the present invention. The cover 36 can be constructed of any suitable material, however, in the preferred embodiment, the cover 36 is constructed similar to that of the wooden log section 12 which comprises the assembly 10 of the present invention. That is, the cover 36 is another log section 38 having a cavity 40 provided therein and can rest on the free upper edges 22 of the side walls 18 and end walls 20 of the assembly 10. The cover 36 also contains a plurality of apertures 42 to allow smoke and other gases to pass freely therethrough.

Further, in order to regulate the amount of smoke which is produced and which reaches the food item being heated or to prevent the combustion of the wooden log section 12, the cavity 14 of the log section 12 can be lined with a non-combustible material 44. In the preferred embodiment, the noncombustible material 44 is a metallic foil such as tin foil or aluminum foil 44. By varying the amount of the area of the cavity 14 which is lined with the metal foil 44, the user can thereby effectively limited the amount of the cavity 14 which is consumed by the combustion of the solid fuel 26. In doing so, the user can effectively prevent consumption of the wooden log section 12 by totally lining the cavity 14 with the metal foil 44. That is, should the user desire to either prevent the generation of smoke from the combustion of the wood comprising the log section 12 and thereby increase the life of the assembly 10, or should the user which to increase the amount of smoke generated by the consumption of the wood comprising the log section 12, the user need only vary the amount of wood contacting the combusting solid fuel 26 by lining the cavity 14 with the metallic foil 44.

Additionally, a wooden log section formed as described above can also be used as a flower or planter box in an adaption which does not utilize the grill 28.

In producing the assembly 10 for heating a food product, the cavity 14 in the wooden log section 12 can be produced by utilizing the apparatus 50 of the present invention. Referring to FIG. 4, the apparatus 50 for forming the cavity 14 in the wooden log section 12 is shown. The apparatus 50 comprises the pivotal member 54 pivotally mounted at its proximal end 56 to the support base 52. The pivotal member 54 pivots about pins 55. The handle 60 is mounted on the pivotal member 54 at a position spaced apart from the proximal end 56 thereof. That is, the handle 60 is mounted to the pivotal member 54 at the end opposite that which is pivotally mounted to the support base 52.

The rotary cutter 64 is fixedly mounted to the pivotal member 54 by supports 62 located on the pivotal member 54 at a position spaced apart from the proximal end 56 of the pivotal member 54. In the preferred embodiment, the rotary cutter 64 comprises a plurality of circular saw blades 72 aligned side by side and mounted on a common spindle 74. The circular saw blades 72 can be standard saw blades well known in the art or can be a dado head which consists of a series of alternating cutting blades and chipping blades which is also well known in the art.

An electric motor 66 is operatively attached to the spindle 74 and drives the rotary cutter 64 to cause the cavity 14 in the wooden log section 12 to be formed. As shown in FIG. 4, a guard or cover 76 can be attached to the support 62 to provide protection to the user from flying debris and to also prevent the user from contacting the spinning blades 72.

The spring 68 operatively connected to the support base 52 and the pivotal member 54, provides a force which biases the free end 57 of the pivotal member 54 away from the support base 52 and thereby urges the rotary cutter 64 away from the log section 12.

The clamp mechanism 70 fixedly mounted on the support base 52 is adapted to clamp the log section 12 in a fixed position during formation of the cavity 14 of the wooden log section 12. The clamping mechanism 70 located on the horizontal support surface 52 and spaced apart from each other can comprise the combination of a fixed stop 78 and a clamp 80 which can be adjusted between a locked clamping position and an unlocked unclamped position. Alternatively, the clamping mechanism 70 can comprise any other suitable device capable of fixedly restraining the wooden log section 12 during the cavity forming process.

In an alternative embodiment, the rotary cutting mechanism 64 can comprise a milling head 73 as shown in FIG. 6. The milling head 73 is connected via a spindle 74 to a driving mechanism such as an electric motor (not shown). The milling head 73 would then be lowered into contact with the wooden log section 12 and would thereby remove a predetermined amount of wood thereby forming the cavity 14.

In operation, the cavity 14 can provide in the log section 12 by clamping the log section 12 in the clamp mechanism 70, starting the motor 66 to cause the cutter 64 to rotate, grasping the handle 60 and applying a force to move the pivotal member 54 downward in the direction of the arrows shown in FIGS. 4 and 5 until the rotary cutter 64 engages the log section 12 and cuts a cavity 14 into the log section 12, and removing the force supplied to the handle 60 to permit the spring biasing force to remove the rotary cutter 64 from the cavity 14 thus formed.

The slots 24 formed in the free upper edges 22 of the end walls 20 consist of a slot or trench formed by removing a linear section of the free edges 22 of the end walls 20.

The invention has been described in an illustrative manner, and it is to be understood the terminology used is intended to be in the nature of description rather than of limitation.

Obviously, many modifications and variations of the present invention are possible in light of the above teachings. Therefore, it is to be understood that within the scope of the appended claims, reference numerals are merely for convenience and are not to be in any way limiting, the invention may be practiced otherwise than as specifically described.

What is claimed is:

1. An assembly (10) for heating a food product, comprising in combination:

a wooden log section (12) having a cavity (14) provided therein defining a trough (17) having a bottom (16), two side walls (18), and two end walls (20), each wall (18,20) terminating in a free upper edge (22), said cavity (14) being adapted to contain a solid fuel (26); and a metal grill (28) having a frame (30) adapted to be supported by said free upper (22) edges of said end walls (20), said grill (28) additionally having a surface (34) adapted to support a food product to be heated.

2. An assembly (10) according to claim 1, wherein said free upper edges (22) of said end walls (20) include a plurality of spaced-apart slots (24), said slots 24 of said free upper edge (22) of one of said end walls (20) being juxtaposed with respect to said slots (24) of said upper edge (22) of the other of said end walls (20); and said metal grill (28) including a frame (30) including a plurality of transverse members (32) adapted to engage said slots (24) provided in said free upper edges (22) of said end walls (20) and to be securely retained therein.

3. An assembly (10) according to claim 2, wherein said grill (28) includes positions means (33) for positioning said surface (34) for supporting a food product to be heated at a position spaced a distance above said free edges (22) of said side walls (18) and said end walls (20).

4. An assembly (10) according to claim 3, wherein said log section (12) is composed of hickory wood.

5. An assembly (10) according to claim 3, wherein said log section (12) is composed of oak wood.

6. An assembly (10) according to claim 3, wherein said cavity (14) of said log section (12) is lined with metal foil (44).

7. An assembly (10) according to claim 2, wherein said assembly (10) further includes a cover (36) and wherein said cover is seated on a support.

8. An assembly (10) according to claim 7, wherein said cover (36) includes a plurality of apertures (42).

* * * * *